(12) United States Patent
Setty et al.

(10) Patent No.: US 11,615,410 B2
(45) Date of Patent: Mar. 28, 2023

(54) HEARTBEATS AND CONSENSUS IN VERIFIABLE OUTSOURCED LEDGERS

(71) Applicant: Microsoft Technology Licensing, LLC, Redmond, WA (US)

(72) Inventors: Srinath Suresh Setty, Redmond, WA (US); Ramarathnam Venkatesan, Redmond, WA (US); Soumya Basu, Ithaca, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/809,647

(22) Filed: Jun. 29, 2022

(65) Prior Publication Data
US 2022/0327532 A1  Oct. 13, 2022

Related U.S. Application Data

(63) Continuation of application No. 16/906,479, filed on Jun. 19, 2020, now Pat. No. 11,403,631, which is a continuation of application No. 15/280,857, filed on Sep. 29, 2016, now Pat. No. 10,733,602.

(51) Int. Cl.
*G06Q 20/38* (2012.01)
*H04L 9/40* (2022.01)

(52) U.S. Cl.
CPC ...... *G06Q 20/3827* (2013.01); *G06Q 20/3825* (2013.01); *G06Q 20/3829* (2013.01); *H04L 63/12* (2013.01); *G06Q 2220/00* (2013.01); *H04L 63/1433* (2013.01); *H04L 2463/102* (2013.01)

(58) Field of Classification Search
CPC .......... G06Q 20/3827; G06Q 20/3825; G06Q 20/3829; H04L 63/12
See application file for complete search history.

(56) References Cited

U.S. PATENT DOCUMENTS

2019/0199535 A1\* 6/2019 Falk .................... G06F 16/1824

\* cited by examiner

*Primary Examiner* — Etienne P Leroux
*Assistant Examiner* — Farhad Agharahimi

(57) ABSTRACT

Heartbeat consensus forming for the state of a digital ledger built upon a blockchain to provide users with the ability to securely, accurately, and verifiably share state information between distrustful parties is provided herein. The digital ledger is hosted in a networked environment, accessible by multiple parties. Heartbeat transactions allow clients, who are not in direct communication with one another and may distrust one another, to verify the integrity of the digital ledger via consensus. The consensus is readily verifiable by each client on its own machine and allows the ledger to be recovered to an agreed-to state in the event of a fault initiated by a client or the host of the ledger, whether malicious or otherwise. The digital ledger is freely movable to different hosts in the event of a fault.

20 Claims, 12 Drawing Sheets

HEARTBEATS AND CONSENSUS IN VERIFIABLE OUTSOURCED LEDGERS

CROSS-REFERENCES TO RELATED APPLICATION

This application is a continuation of U.S. application Ser. No. 16/906,479, filed Jun. 19, 2020, which is a continuation of U.S. application Ser. No. 15/280,857, filed Sep. 29, 2016, now U.S. Pat. No. 10,733,602 the disclosures of which are hereby incorporated by reference in their entireties.

BACKGROUND

Parties are increasingly using digital transactions to conduct their affairs. Digital transactions include, but are not limited to: online shopping, transfers of funds, releases of digital assets, the creation and management of "cryptocurrencies", etc. Digital transactions require systems and methods for auditing those transactions and verifying their authenticity so that the parties of the transactions can trust that the transactions occur according to their expectations and that a clear and unambiguous record for those transactions exists. For example, users of a ride hailing application that dynamically prices its services may desire a reliable and tamper-evident log of the prices of services at time of request.

In one example, parties may rely on a trusted (or neutral) third party (or conglomeration of parties) to arbitrate their transactions or audit them after the fact, which requires an additional party to be part of the transaction, for the transacting parties to agree to the third party, and for the third party to periodically demonstrate its ongoing trustworthiness. In another example, parties may rely on a write-only database that maintains entries for transactions for later auditing (e.g., a blockchain), but depending on the database, extremely high read and write latencies are required to avoid fraudulent "double spends" of transactional resources. Unfortunately, due to the high amount of computational resources required to maintain and write to a verifiable write-only database, such as a blockchain, in a secure manner, individual transactions can take a long time to process, and are vulnerable to several attacks (e.g., dropping/reordering/tampering with transactions, man-in-the-middle attacks).

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and hardware aspects of computer readable storage media are provided herein for enabling a Verifiable Outsourced Ledger (VOL) to incorporate additional security features. A VOL allows parties to store various transactions with other parties (who may not be fully trusted) in a cloud environment (that is also not fully trusted), via a searchable blockchain encoding the transactions to be recorded. The present disclosure ensures that multiple parties see the same state of the VOL and can avoid and recover from malicious (or erroneous) transactions made by the other parties or the host of the VOL. Parties maintaining their transactions in a VOL periodically transmit their view of the VOL as a "heartbeat" to be incorporated into the blockchain of the VOL. The parties will periodically query the VOL to determine whether they agree with the state of the VOL as it is hosted on the server, and in the event of disagreement will form a consensus with other parties as to whether malicious actions (e.g., dropping/reordering/tampering with transactions, man-in-the-middle attacks) are taking place. When the consensus determines that malicious actions are taking place, the VOL may be moved to another server, rolled back to an agreed-to state, and transactions taking place after the agreed-to state rerun. The heartbeat consensus thereby improves the security and reliability of the VOL and functionality of the systems that make use of it.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
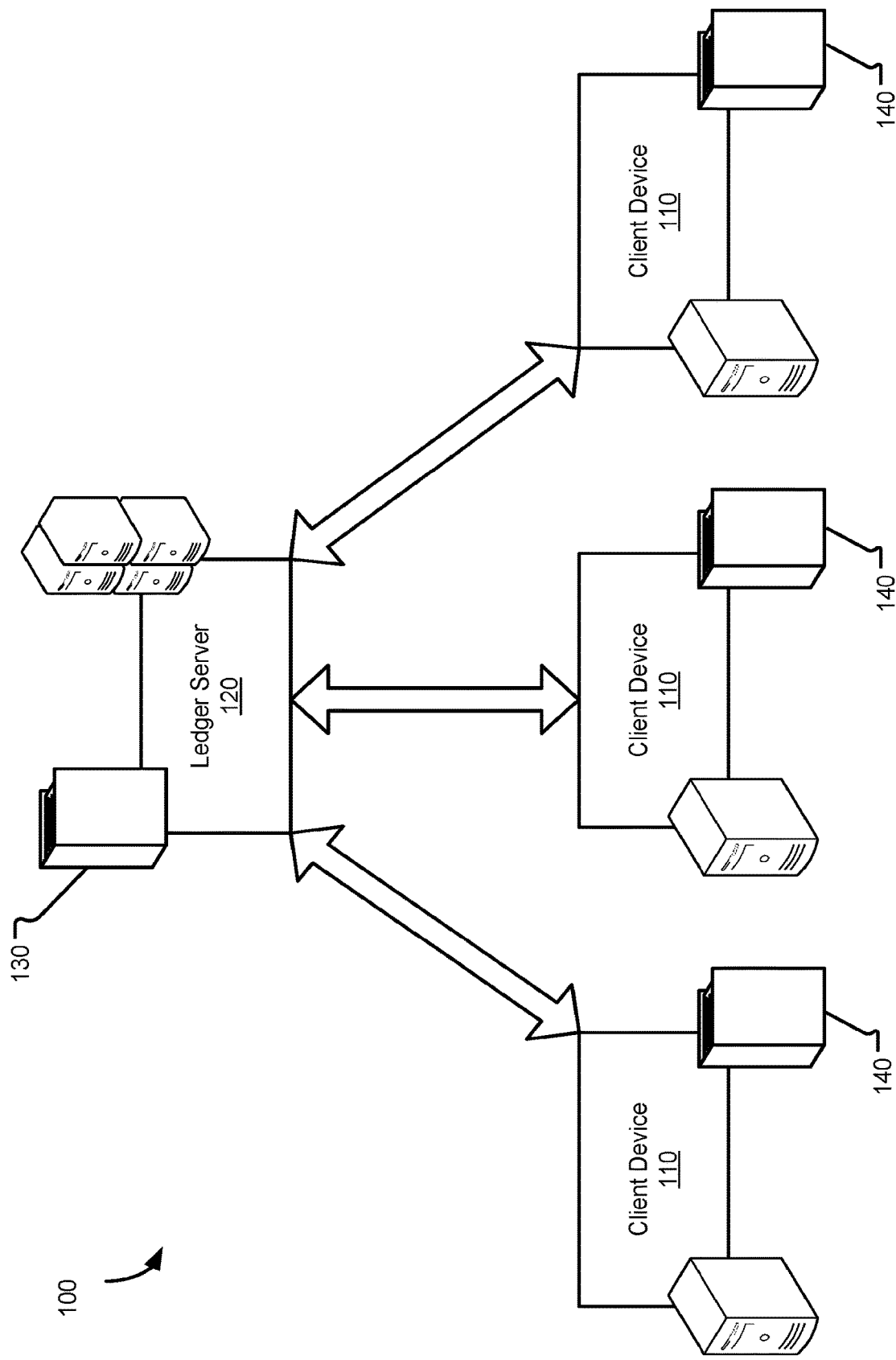
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and hardware aspects of computer readable storage media are provided herein for enabling ledgers that are accessible in a networked environment that multiple (and potentially distrustful) entities may access to share state information. The present disclosure improves the functionality of the computing devices implementing it by removing intermediary parties from the transactions, thus lowering transactional latency, allowing a blockchain to be executed in a cloud environment, which allows for a more efficient allocation of processing resources and higher maximum transactional throughputs than required by other digital ledgers. As will be appreciated, digital ledgers may provide myriad types of state machines and handle innumerable transaction types; the use scenarios provided herein are therefore understood to present non-limiting examples.

Systems, methods, and hardware aspects are further provided to ensure that multiple parties see the same state of the digital ledger and can avoid and recover from malicious (or erroneous) transactions made by the other parties or the host of the digital ledger. Parties maintaining their transactions in a digital ledger periodically transmit their view of the ledger as a "heartbeat" to be incorporated into the blockchain of the ledger. The parties periodically query the ledger and determine whether a consensus among the parties exists as to the state of the ledger as it is hosted. In the event of disagreement, the parties will recover the ledger to a prior state based on the consensus to undo any malicious actions (e.g., dropping/reordering/tampering with transactions, man-in-the-middle attacks) or errors that caused the disagreement. When the consensus determines that malicious actions are taking place, the digital ledger may be moved to another server, rolled back to a prior agreed-to state, and transactions taking place after the agreed-to state may be rerun. The heartbeat consensus thereby improves the security and reliability of the digital ledger and functionality of the systems that make use of digital ledgers.

FIG. 1 illustrates an example environment 100 in which the present disclosure may be practiced. As illustrated, one or more client devices 110 are in communication with a ledger server 120 that hosts a Verifiable Outsourced Ledger (VOL 130). Although a given number of client devices 110, ledger servers 120, and VOLs 130 are shown in the example environment 100, one of ordinary skill in the art will appreciate that more or fewer of each component may be present in different aspects.

Each of the client device 110 and ledger server 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 6, 7A, 7B, and 8. Client devices 110 are operated by users, who may be humans or automated systems (e.g., "bots"). In various aspects, the client device 110, and ledger server 120 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The client devices 110 are in communication with the ledger server 120 to report transactions to be recorded in a particular VOL 130. In various aspects, the client devices 110 may be on-premises computing devices or may be provided as virtual machines as part of a cloud service, which may be the same or a different cloud service than that used to provide the ledger server 120 in aspects where the ledger server 120 is provided as a cloud service to various clients.

The client devices 110 are operable to maintain local copies 140 of the VOLs 130 that are maintained on and shared between multiple client devices 110 by the ledger server 120 to audit and track the state of the VOLs 130. The local copies 140 provide the clients, who may actively distrust the other clients or the service provider, or who wish to "trust, but verify" that the other clients or the service provider are not manipulating the state machine maintained by the VOL 130 for their own gain. The client devices 110 may request or query for the current state of a state machine (or an encrypted value thereof) maintained in the VOL 130, some or all of the transactions submitted to affect the state machine, and metrics related to the VOL 130 (e.g., frequency of transaction submissions, number of transactions, client identities) to verify whether the shared VOL 130 maintained on the ledger server 120 matches the client's view of the VOL 130 maintained locally on the client device 110 as the local copy 140. In various aspects, the local copy 140 may mirror the VOL 130 maintained on the ledger server 120, may mirror a previous state of the VOL 130 (e.g., when the client has not been provided with the most recent transactions affecting the VOL 130), or may be a reduced-size version of the VOL 130. For example, a client may be interested in learning of a state maintained by the VOL 130, but not auditing the VOL 130, and therefore a reduced-size local copy 140 of the VOL 130 provides the state information, but not a list of transactions.

The ledger server 120 is operable to maintain multiple VOLs 130 for use by multiple sets of clients. The ledger server 120 maintains one or more VOLs 130, and may be part of a public cloud service, a private cloud service, or dedicated device run by a VOL provider. The clients use one or more client devices 110 to submit transactions to the ledger server 120, which identify: the party initiating the transaction, the VOL 130 in which the transaction is to be recorded, the effect of the transaction, and the identity of any recipient parties of the transaction. Clients (as initiators or recipients of a transaction) are identified via a public key of a public/private key pair associated the client. The ledger server 120 maintains the public keys for the associated clients that access the VOLs 130 that are hosted by the ledger server 120. The client devices 110 securely maintain the private keys of their associated clients, and use the private keys to sign transactions, which the ledger server 120 is operable to verify based on the associated public key. One of ordinary skill in the art will be familiar with public/private key cryptography and digital signatures.

The ledger server 120 is operated by a service provider that provides clients with a transparent, verifiable, and portable digital ledger by which to share state information—the VOL 130. The ledger server 120 stores the state information in the VOL 130 in an encrypted and traceable format via a blockchain 200 (discussed in greater detail in regard to FIG. 2) and the transactions that the clients submit to the VOL 130 so that the clients may monitor the VOL 130 for unexpected behaviors and transport the VOL 130 in a last-known-good state to a different ledger server 120 when it is suspected that the VOL 130 has been manipulated or compromised.

Each VOL 130 is operable to maintain a secure record of the transactions that clients conduct. In various aspects, the transactions specify that one or more states maintained by the VOL 130 are to be changed. In one example, a first client device 110 signals that a first client is initiating a transfer of funds to a second client that is to be recorded in a first VOL 130 as a change of states in account balances. In another example, a second client device 110 signals that a third client is recording a bid for an auction as a transaction that is to be recorded in a second VOL 130 as a change in state of a record. In a further example, a third client device 110 signals that input (e.g., text entry, a button click) is to be made to affect the state of program whose state machine is maintained in a third VOL 130.

Figure 2:
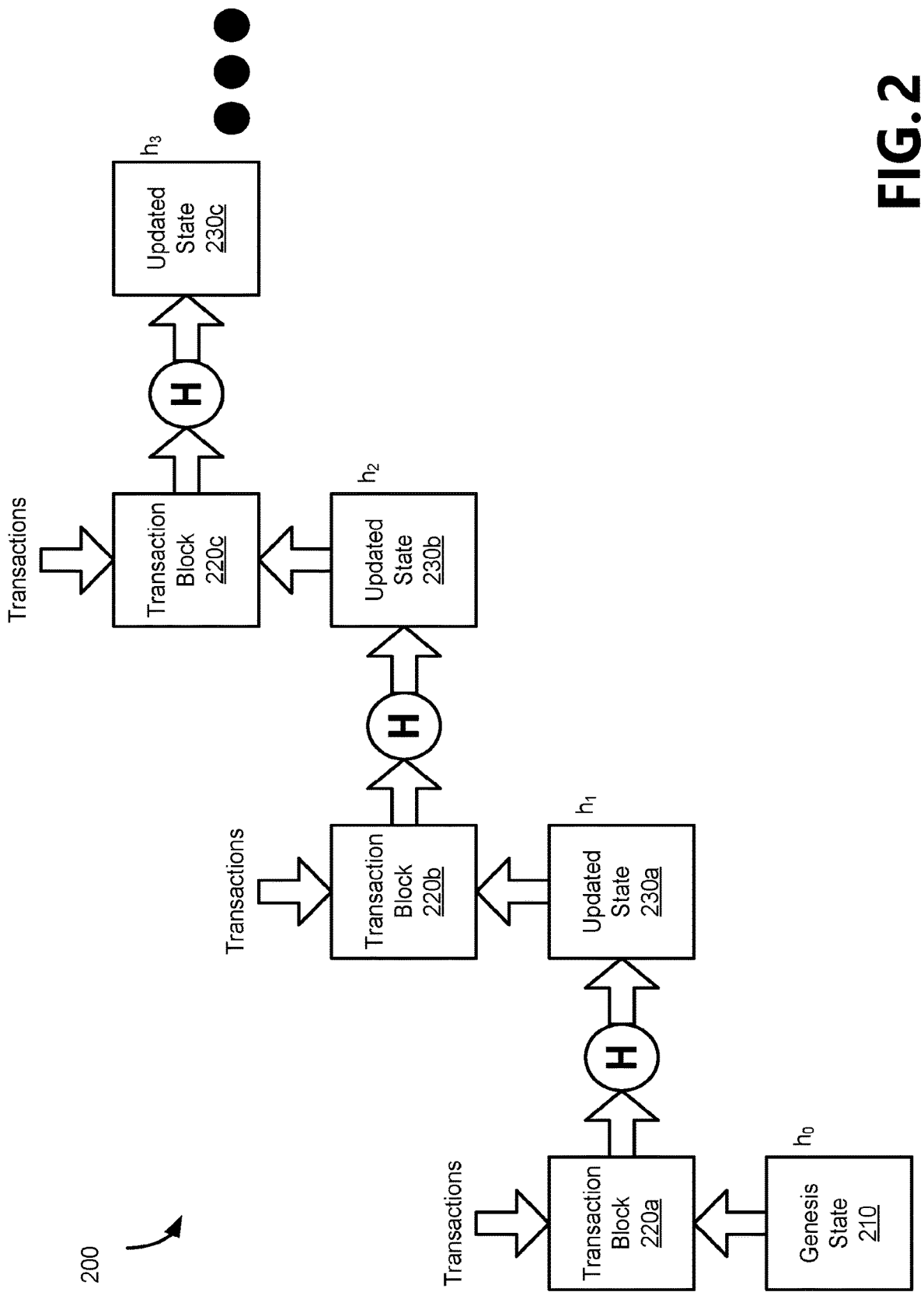
FIG. 2 illustrates an example blockchain.

FIG. 2 illustrates an example blockchain 200. As will be appreciated, a blockchain 200 maintains the series of transactions made by the parties that affect a previous state of the blockchain 200 in an encrypted and traceable format. The blockchain 200 provides clients the ability to access a sequential record of all transactions submitted to the VOL 130. The blockchain 200 supports requests for various views and queries to support calculations and verification of its accuracy to highlight the ordering of transactions and the results of the latest transactions.

As illustrated, the initial state of the blockchain 200 is represented by genesis state 210. The genesis state 210 is available to each client that has access to the blockchain 200. A client who has access to the genesis state 210, knows the hashing algorithm used to construct the blockchain 200, and the ordered list of transactions maintained by the VOL 130 is enabled to reconstruct the tail value (i.e., the associated updated state 230 for a given "height" in transaction blocks 220 added) of the blockchain 200 at any point in the history of the blockchain 200. The genesis state 210 initializes the blockchain 200 based on a hash of a seed block of data and a digital signature for the VOL 130. In various aspects, the seed block may be a value that the parties using the VOL 130 agree upon, such as, for example: a shared secret, such as, for example, the initial balances of each client's respective account being tracked by the VOL 130; a final or given state of another VOL 130; a nonce, such as, for example, a timestamp; or an identifier for the VOL 130. In various aspects, the digital signature of the hashed seed block uses a signature key (e.g., a private key for the VOL 130 or the ledger server 120 maintaining the VOL 130).

Each time that a client submits a transaction to the ledger server 120 to affect a VOL 130, the transaction is organized into a transaction block 220 for addition to the blockchain 200. In various aspects, several transactions are received that are organized into a single transaction block 220 based on a size (in bits) of the transactions (e.g., at least X bits, no more than Y bits, at least X bits but no more than Y bits), a timeframe in which the transactions are received (e.g., a Z second time window), or combinations of sizes and timeframes. In another aspect, a large transaction (i.e., a transaction that exceeds a maximum bit size allowed by a hash function for the blockchain 200) is broken into multiple transaction blocks 220. The current state of the blockchain 200 is incorporated into the transaction block 220 as a cryptographic pointer for the state of the blockchain 200 (e.g., a cryptographic hash of the previous state of the blockchain). The transaction block 220 is then hashed to produce an updated state 230 as the tail-value for the blockchain 200. The size of the blockchain 200 thus remains constant in memory regardless of the number of transaction blocks 220 that are maintained therein; the output size of the hash function used to append transaction blocks 220 to the blockchain 200 determines the size of the blockchain 200 in memory storage. In various aspects, the memory storage maintains each VOL 130 as an identifier, a current state of the blockchain 200, and a previous state of the blockchain 200.

Various hashing algorithms may be used to advance the state of the blockchain 200 as new transactions are received from clients. A hashing algorithm (also referred to as a "hash function") yields a one-way encryption of data, which may be achieved according to various algorithms known to those of ordinary skill in the art (SHA-2, SHA256, MD5, BLAKE2, Keccak, GOST, etc.). In various aspects, the transaction blocks 220 includes additional information about itself related to: identifying a version of the hash construction rules, a signature or checksum for the transaction block 220, a timestamp or a height of the blockchain 200 at the time the transaction block 220 is recorded, etc.

As each transaction block 220 is added to the records stored within the blockchain 200, the "height" of the blockchain 200 is incremented. For example, at an initial state (i.e., when the genesis state 210 is the tail value), the blockchain 200 will have a height of zero ($h_0$); after a first transaction block 220a is appended, the blockchain 200 will have a height of one ($h_1$); after a second transaction block 220b is appended, the blockchain 200 will have a height of two ($h_2$); after a third transaction block 220c is appended, the blockchain 200 will have a height of three ($h_3$); etc.

The VOL 130 is queryable for its tail value (i.e., the state having the greatest height in the blockchain 200), the internal blocks (e.g., previous tail values), as well as properties related to metadata related to the use and maintenance of the blockchain 200. Such metadata include, but are not limited to: a current height of the blockchain 200, clients associated with the blockchain 200, a number of transactions from one or more given clients, a frequency of transaction from one or more given clients, a level of consensus from the clients regarding the state of the blockchain 200 (e.g., X of Y clients agree that the tail value or height of the blockchain 200 is equal to Z), etc.

Figure 3:
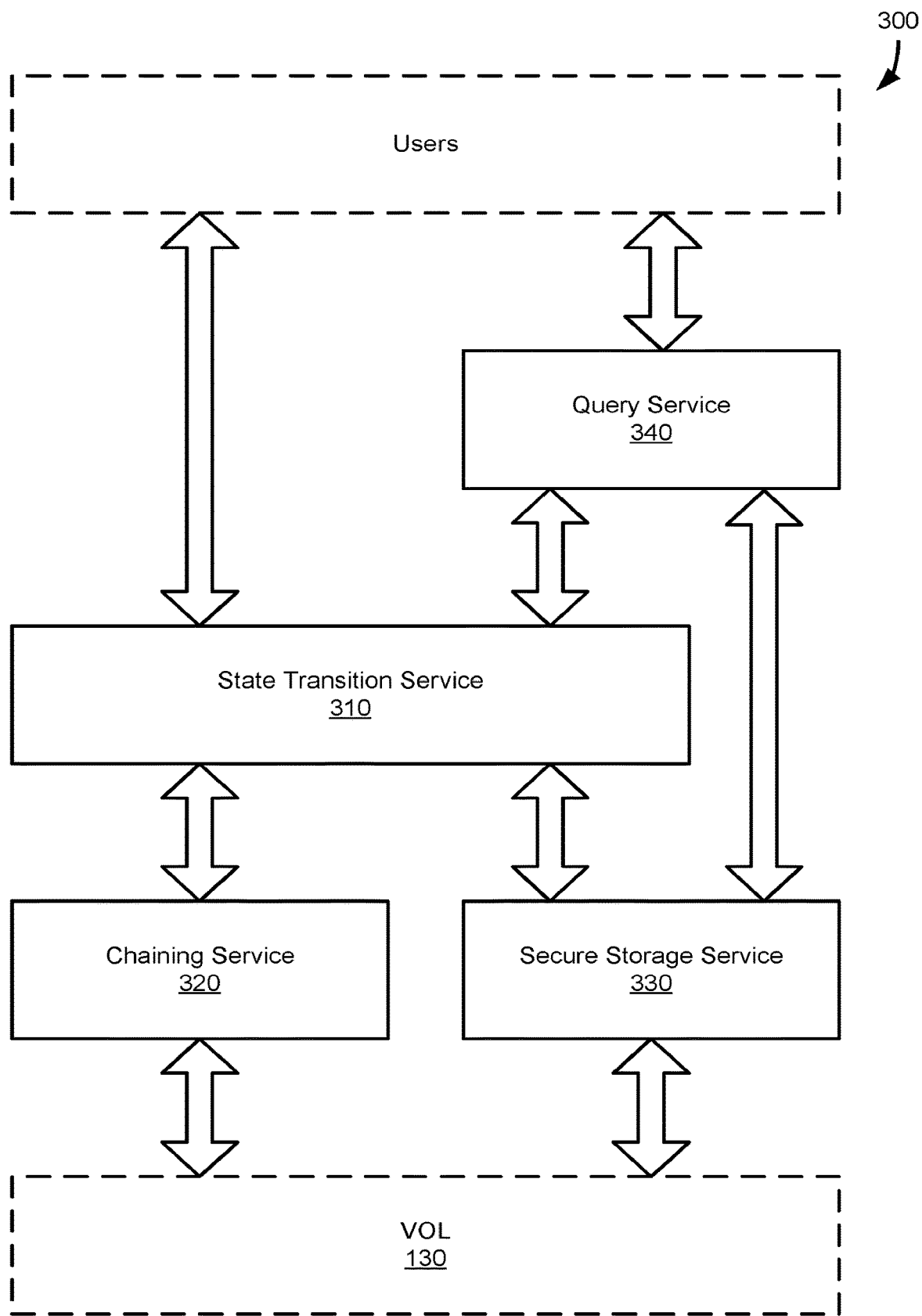
FIG. 3 illustrates a service architecture.

To manage the blockchain 200 and allow for the querying and verification thereof by clients, the ledger server 120 provides several components with different interfaces by which to interact with the blockchain 200, which are discussed in relation to FIG. 3. FIG. 3 illustrates a service architecture 300 that provides a state transition service 310, a chaining service 320, a secure storage service 330, and a query service 340 to interact with the blockchains 200 and provide the VOL 130 to the clients. In various aspects, each of the state transition service 310, the chaining service 320, the secure storage service 330, and the query service 340 may be provided as Application Program Interfaces (APIs) that are callable by one or more computing devices, or may be dedicated hardware components operable to perform the operations specified. According to aspects, the architecture 300 is deployed to the ledger server 120 to manage the VOL 130 and each of the client devices 110 to manage the local copies 140 as the VOL 130 is managed.

The state transition service 310 forms the transaction blocks 220 that are hashed to provide the blockchain 200. The state transition service 310 receives transactions, from the client devices 110 and from the ledger server 120, serializes those transactions and embeds the tail-end value of the current state of the blockchain 200 into the transaction block. In various aspects, the state transition service 310 receives the transactions from a query service 340 or directly from the users. The transaction block 220 is stored by the state transition service 310 with the secure storage service 330 to receive a receipt. The state transition service 310 signals the chaining service to append the transaction block 220 to the blockchain 200, and implements the commands present in the transactions included in the transaction block 220 to update the state of the VOL 130. The state transition service 310 is in communication with the chaining service 320 and the secure storage service 330 and allows them to share data.

The chaining service 320 enables the initialization of the blockchain 200 and the incrementation of the blockchain 200. In various aspects, an initialization function provided by the chaining service 320 creates a genesis state 210 and a digital signature of the genesis state 210 from inputs of a hashed value of a block (e.g., a seed block) and a receipt received from the secure storage service 330. When initializing a blockchain 200 for a VOL 130, the chaining service 320 is provided with an identifier for the VOL 130 so that transactions and queries from clients can be directed to the appropriate blockchain 200. The chaining service 320 maintains a state for each VOL 130 managed by the chaining service 320 that provides the identifier for each VOL 130, the value of the current state of the blockchain 200, and the value of the previous state of the blockchain 200.

In additional aspects, an APPEND function provided by the chaining service increments the blockchain 200 (e.g., moving from $h_0$ to $h_1$, $h_1$ to $h_2$, etc.) when a transaction block 220 is provided, to produce an updated state 230 as a new tail for the blockchain 200 and a digital signature of the updated state 230. In one aspect, the chaining service 320 provides an APPEND function that accepts an identifier for a VOL 130 whose blockchain 200 is to be updated, a hashed transaction block 220, a receipt for the current transaction block 220, and a receipt for the previous transaction block 220 as inputs and provides an updated state 230 and a digital signature of the updated state 230 as outputs. In various aspects, the updated state 230 and digital signatures are stored on hardware memory (at the client device 110 or the ledger server 120) along with the previous states and digital signatures, while in other aspects the updated states 230 and digital signatures overwrite prior values for a given VOL 130. The chaining service 320 signs a new updated state 230 and adds it to the blockchain 200 such that the new updated state 230 cryptographically extends the blockchain 200 from the previous state.

A secure storage service 330 enables the client devices 110 and ledger server 120 to add to the blockchain 200, retrieve states from the blockchain 200, and create receipts for transactions made to the blockchain 200. In one aspect, the secure storage service 330 provides a PUT function that accepts a transaction block 220 as an input and provides a hashed value of that transaction block 220 and a receipt for that hashed value as outputs, which are used as inputs by the chaining service 320, such as, for example, in the APPEND function discussed above. The receipt produced by aspects of the PUT function is a digital signature of the hashed value produced by the PUT function. In another aspect, the secure storage service 330 provides a GET function that accepts an inquiry value and returns the transaction block 220 that would have yielded the inquiry value if a user had previously called PUT with the inquiry value. In a further aspect, the secure storage service 330 stores the transactions received from the mutually distrustful parties (or the transaction blocks 220) in the VOL 130 in the order in which those transactions affect the state machine maintained in the VOL 130.

The query service 340 is operable to handle general queries about the state of the VOL 130 and transactions made thereto. In one aspect, the VOL 130 maintains the tail value of the blockchain 200 (i.e., the state with the greatest height) as well as all of the transactions issued to the VOL 130 to provide an auditable chain to the clients. The query service 340 allows clients to request the highest height value from the blockchain 200, individual commands stored in the VOL 130, as well as metadata related to the VOL 130 (e.g., a current height of the blockchain 200, clients associated with the blockchain 200, a number of transactions from one or more given clients, a frequency of transaction from one or more given clients, a level of consensus from the clients regarding the state of the blockchain 200).

Because the VOL 130 is accessible in a networked environment, the query service 340 is operable to determine whether the requesting user has access to read from or write to the VOL 130 identified in a given query or request before that query or request is implemented on the VOL 130. In various aspects, the query service 340 is operable to use certificates, login tokens, digital signatures (e.g., signing with a public/private key pair), known IP or MAC addresses, and the like to verify whether a given user has permission to access a given VOL 130. In response to determining that a given user is not recognized or otherwise lacks permissions, the query service 340 is operable to request authorization credentials from the user (e.g., to prompt a login) or to inform the user that access has been denied. In response to recognizing the user and the user having the appropriate permissions, the query service 340 is operable to execute the query or request made from the given user. As will be appreciated, the queries or requests (or their containers, such as TCP/IP datagrams) may include the identifying information for the requesting users in addition to or separately from the arguments of the queries and requests.

In one aspect, the query service handles a SYNC request received from the client devices 110 or ledger server 120 to download data stored in the VOL 130 when requested by an authorized user. In one aspect, the SYNC request includes: an identifier for a VOL 130; a continuation token, identifying a height in the blockchain 200 from which data or metadata are requested; and a request type identifier.

For example, a client using a client device 110 with limited processing resources or bandwidth availability may request, via a SYNC request, for the query service 340 to return metadata of the value of the tail end of the blockchain 200. The SYNC request in this example includes the identifier for the specific VOL 130 the client is interested in, a continuation token that specifies the metadata stored at the maximum height of the blockchain 200 is of interest, and a request type that specifies that the tail end value is of interest.

In another example, a client device 110 with greater processing resources or bandwidth availability than in the previous example may request, via a SYNC request, the transactions and the current state of the blockchain 200 (e.g., to audit whether the state machine maintained in the VOL 130 matches the client's expectations). The SYNC request in this example includes the identifier for the specific VOL 130 the client is interested in, a continuation token that specifies the last height of the blockchain 200 that the client has previously seen, and a request type that specifies that the transactions and the tail end value are of interest and are to be returned to the client device 110.

In another aspect, the query services 340 handle a SEND request received from the client devices 110 or ledger server 120, to add a transaction to the VOL 130 when requested by an authorized user. In one aspect, the SEND request includes: an identifier for the VOL 130 in which the transaction is to be tracked, and a command that the state machine maintained by the VOL 130 can interpret. For example, where a SEND request from a first bank transferring funds to a second back in which the transfer is tracked in a first VOL 130, the SEND request includes as its arguments a identifier for the first VOL 130 and a command that specifies the account numbers, amounts, timings, etc. needed to effectuate a balance transfer in the state machine maintained in the VOL 130. As will be appreciated, depending on the state machine maintained in the VOL 130, the commands may take various forms suited or formatted to the implementation of the VOL 130, including, but not limited to: images, signed/encrypted requests, plaintext command lines, etc.

Figure 4A:
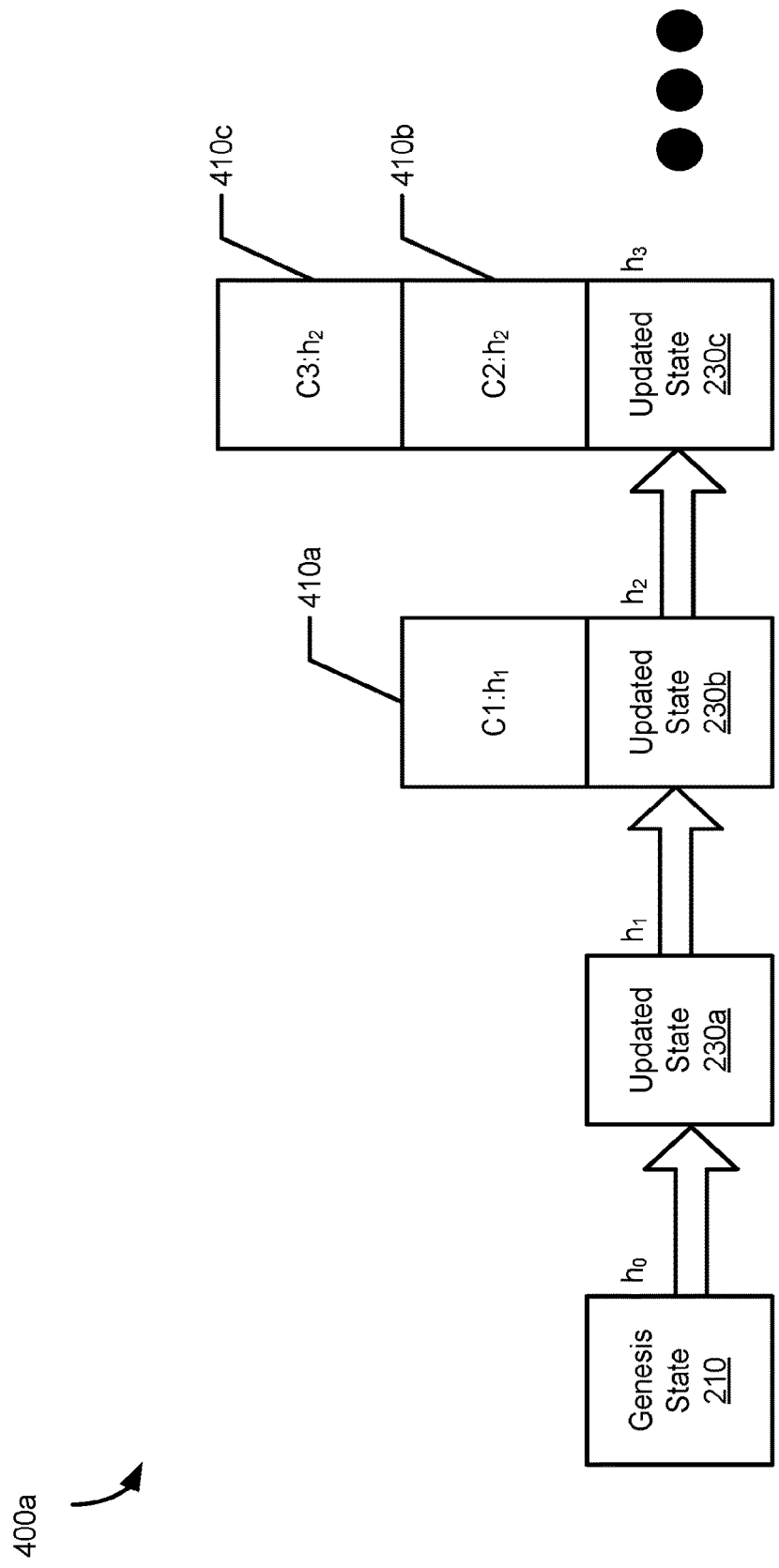
FIGS. 4A-4C illustrate various histories for a blockchain that incorporate various heartbeat transactions.
Figure 4B:
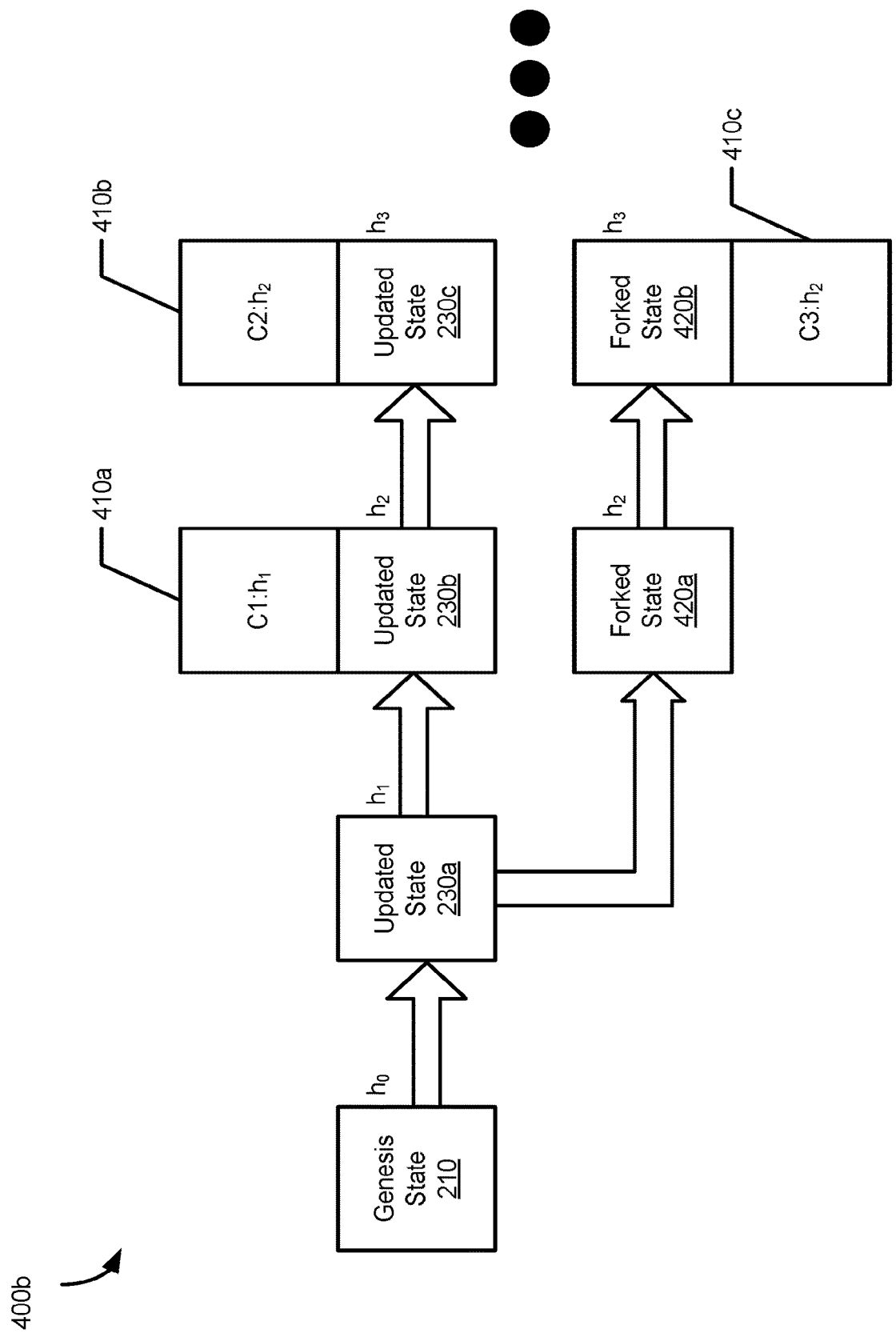
Figure 4C:
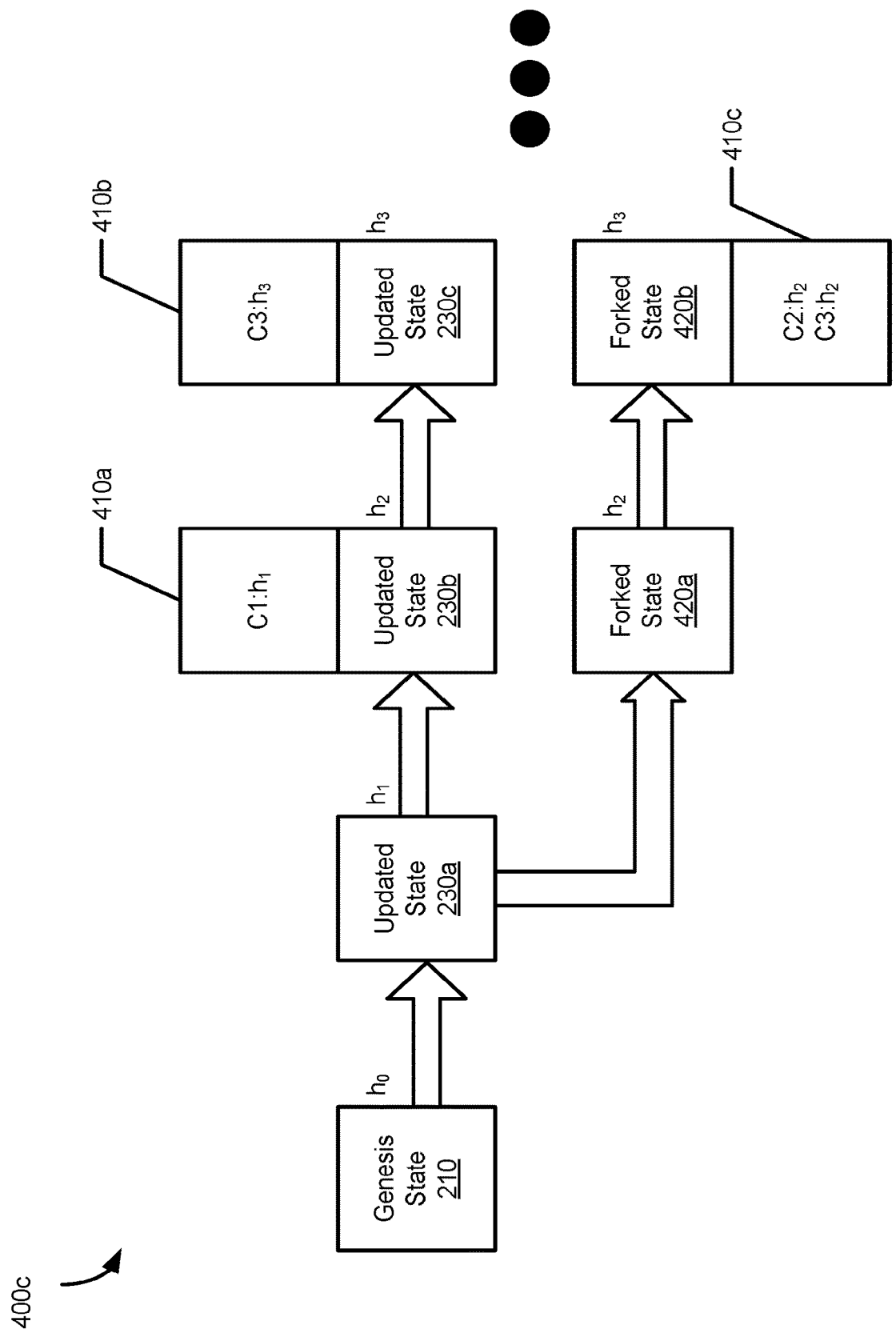

FIGS. 4A-4C illustrate various histories 400 for a blockchain 200 that incorporate various heartbeat transactions 410. A heartbeat transaction 410 allows a given client to share its current view of the VOL 130 (e.g., from the client's the local copy 140) with the other clients as a transaction incorporated into the transaction block 220 for the next state of the blockchain 200 hosted in the VOL 130. According to aspects, heartbeat transactions 410 do not directly affect the state of the state machines maintained in the VOL 130, but are incorporated into transactions blocks 220 with transactions that do affect those states. The heartbeat transactions 410 allow the clients to determine a consensus view of the VOL 130 without needing to directly communicate with one another; retaining anonymity between parties.

Heartbeat transactions 410 are transmitted from the client devices 110 periodically to the ledger server 120 to incorporate each client's view of the VOL 130 into the history of the VOL 130. A heartbeat transaction 410 is a cryptographic hash of the tail value of the blockchain 200 and its height (e.g. $h_0$, $h_1$, $h_2$, etc.) as known to the submitting client. In various aspects, the hash and height are digitally signed by the given client's signature key to allow each client to understand which other clients have seen a given state of the VOL 130 and to prevent the heartbeat transactions 410 from being spoofed by another client or the ledger's host.

In the event of a discrepancy due to an error or attack (e.g., maliciously inserting a block into the blockchain 200), heartbeat transactions 410 allow users to detect (by their absence or inconsistencies in use) when a fork in the blockchain 200 has occurred. For example, a first client who submitted a heartbeat transaction 410 and does not see that heartbeat transaction 410 incorporated into the subsequent states of the blockchain 200 will know that a fork has occurred. In another example, when a second party does not see a heartbeat transaction 410 from the first party for a preset amount of time or height increments of the blockchain 200 will know that a fork has occurred. By digitally signing the heartbeat transactions 410, a malicious party is prevented from spoofing a given client's view of the VOL 130 and maintaining that a party viewing a second fork is still part of the first fork.

FIG. 4A illustrates a first history 400a that integrates a first heartbeat transaction 410a and second heartbeat transaction 410b (generally, heartbeat transactions 410) in which three clients ($C_1$, $C_2$, and $C_3$) and the ledger's host are honest and do not maliciously or erroneously attempt to fork the state machine maintained by the VOL 130. The first client has submitted a first heartbeat transaction 410a that includes a hash of the updated state 230a at $h^1$, which is incorporated into the second updated state 230b at $h_2$. The second and third clients ($C_2$ and $C_3$) that request the second updated state 230b will see that the first client ($C_1$) viewed the blockchain 200 at $h_1$. The clients $C_2$ and $C_3$ will submit their own heartbeat transactions 410 indicating that they have seen and agree with the state of the blockchain 200 at $h_2$. These heartbeat transactions 410 are incorporated in the illustrated example into the transaction block 220 used to build the third updated state 230c at $h_3$, which will be further shared as the blockchain 200 advances.

As will be appreciated, discrepancies can exist even while all of the parties are participating honestly and correctly in the blockchain 200. For example, a client may go offline and cease transmitting heartbeat transactions 410 temporarily. In another example, the timing of heartbeat transactions 410 and/or the sizes of other transactions may split heartbeat transactions 410 of a given state across multiple updated states 230 (e.g., in the example first history 400a the second heartbeat transaction 410b may state $h_1$ instead of $h_2$). To resolve these differences, the clients employ various heartbeat consensus-forming techniques to ensure that the state of the VOL 130 remains consistent between them.

A heartbeat consensus takes into account the number of clients and the number of failures to determine whether consensus is lost. In one aspect, a failure occurs when a client notes that another client has not provided a heartbeat transaction 410 for a set number of incrementations to the height of the blockchain 200. In another aspect, a failure occurs when a client receives a set number of responses from the VOL 130 that do not incorporate its own heartbeat transactions 410. In a further aspect, a failure occurs when a client receives a response from the VOL 130 that contradicts its view of the state machine maintained by the VOL 130.

FIG. 4B illustrates a second example history 400b in which a first example consensus forming technique uses heartbeats to detect a "crash failure" from a client or a malicious server forking the blockchain 200. FIG. 4C illustrates a first example history 400c in which a second example consensus forming technique uses heartbeats to detect a malicious user or malicious server forking the blockchain 200 (e.g., posing a Byzantine Generals problem to the honest clients to determine whether the VOL 130 is accurate).

In each of the discussed techniques, a number of clients participating in the VOL 130 will be known from the creation of the VOL 130, or a dynamic number of clients may participate in a VOL 130 via the use of a Proof of Work (PoW) system. As will be appreciated, a PoW system sets out an asymmetrical problem that is difficult for the requesting party to perform, but simple for the existing parties to verify. The PoW system allows adjustments to the number of parties using the VOL 130, while discouraging frivolous joining/leaving. When a party completes a PoW problem, it is treated like a heartbeat transaction 410 (e.g., in place of a digital signature of a prior block) that is used to increment (or decrement) a number of parties using the given VOL 130 from a previous number and alert the current clients to this change. Various PoW systems may be used in various aspects, and individual VOLs 130 may allow or disallow their use as the clients specify.

FIG. 4B illustrates a second history 400b that integrates heartbeat transactions 410 in which three clients ($C_1$, $C_2$, and $C_3$) are honest, but the ledger's host has forked (maliciously or erroneously) the state machine maintained by the VOL 130 and provides a different view to $C_3$ than to $C_1$ and $C_2$. Because $C_1$ and $C_2$ do not see heartbeats from $C_3$, and $C_3$ does not see heartbeats from $C_1$ or $C_2$, each of the clients will know that a failure has occurred and that they are no longer sharing a consensus view of the VOL 130. As will be appreciated, the amount of transaction blocks 220 that are added to the blockchain 200 before a crash failure is determined to have occurred may vary in different aspects and the change in height shown in the second history 400b is provided as a non-limiting example.

In response to the clients determining that a "crash fault" or malicious attack initiated by the ledger server 120 or (a man-in-the-middle impersonating the ledger server 120) has resulted in the clients receiving different views of the VOL 130, the VOL 130 will (optionally) be moved to a new host and reinitialized from a last-known-shared state of the blockchain 200. In various aspects, the new host for the VOL 130 is set at the time the VOL 130 was initialized or is selected according to an algorithm encoded in the genesis state 210. The last-known-shared state is based on a number of clients who agree to that state derived from the number of failures. For a crash failures, the number of clients to set the last-known-shared state is F+1, where F is the number of failures. For example, if one failure occurred, (F=1), the last-known-shared state would have to be agreed upon by two clients (1+1=2). In another example, if seven failures occurred (F=7), eight clients (7+1=8) would need to agree to a last-known-shared state for a crash failure.

In the example illustrated in FIG. 4B, a first forked state 420a (at $h_2$) leads to a second forked state 420b (at $h_3$) that is visible only to $C_3$. Clients $C_1$ and $C_2$ both see an updated state 230c at $h_3$. Because there is one failure ($C_3$'s incorrect view of the second forked state 420b being correct at $h_3$), and two clients ($C_1$ and $C_2$) agree that the third updated state 230c is the correct state for $h_3$, the VOL 130 will be reinitialized with the third updated state 230c as its correct state.

FIG. 4C illustrates a third history 400c that integrates heartbeat transactions 410 in which the state machine maintained by the VOL 130 has forked (maliciously or erroneously). The fork illustrated in FIG. 4C results in different views of the ledger (or separate ledgers) being provided to $C_1$ and $C_2$ in a Byzantine fault (in which different symptoms are presented to different observers of the fault). For example, the server and $C_3$ are colluding to send $C_1$ and $C_2$ different views of the ledger to attempt a "double spend" attack—using the same assets in $C_3$'s account to buy goods/services from both $C_1$ and $C_2$, without the other's knowledge.

In response to the clients determining that a "Byzantine" fault (either an error or attack) has resulted in the clients receiving different views of the VOL 130, the VOL 130 will be moved to a new host and reinitialized from a last-known-shared state of the blockchain 200. In various aspects, the new host for the VOL 130 is set at the time the VOL 130 was initialized or is selected according to an algorithm encoded in the genesis state 210. The last-known-shared state is based on a number of clients who agree to that state derived from the number of failures. For a Byzantine fault, the number of clients to set the last-known-shared state is 2·F+1, where F is the number of failures. For example, if one failure occurred (F=1), the last-known-shared state would have to be agreed upon by three clients (2·1+1=3). In another example, if seven failures occurred (F=7), fifteen clients (2·7+1=15) would need to agree to a last-known-shared state for a Byzantine fault.

In the example illustrated in FIG. 4C, a first forked state 420a (at $h_2$) leads to a second forked state 420b (at $h_3$) that is visible and agreed upon by $C_2$ and $C_3$. Client $C_1$, however, does not see the second forked state 420b as the correct state, and instead last submitted a heartbeat transaction 410 for inclusion in the second updated state 230b. Because there is one failure ($C_3$'s forking of the blockchain 200), and the two honest two clients ($C_1$ and $C_2$) do not agree on the state of the blockchain 200, a Byzantine fault has occurred. The VOL 130 will therefore be reinitialized with the first updated state 230a as its initial state, as the first updated state 230a is the state with the greatest height that three parties (2·1+1=3) agree on being correct.

In various aspects, when a VOL 130 is failed over to a new service provider, one or more parties may be excluded from participating in the VOL 130, either temporarily or permanently. For example, if it is determined that $C_3$ intentionally forked the blockchain 200 to attempt a double spend or other attack, $C_3$ may be banned from using the successor VOL 130.

Figure 5A:
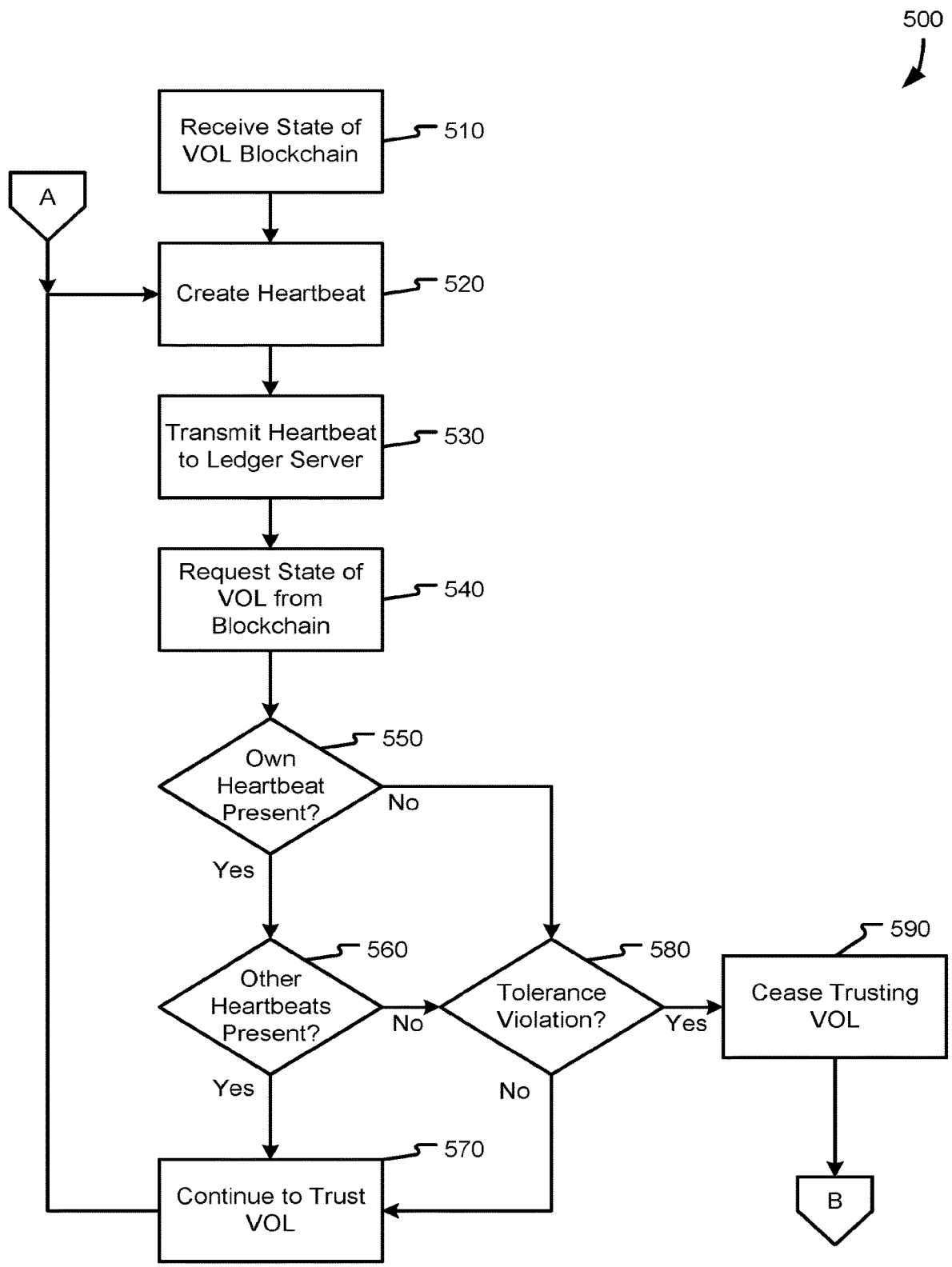
FIGS. 5A and 5B are a flow chart showing general stages involved in an example method for ensuring that multiple parties see consistent states of a digital ledger.
Figure 5B:
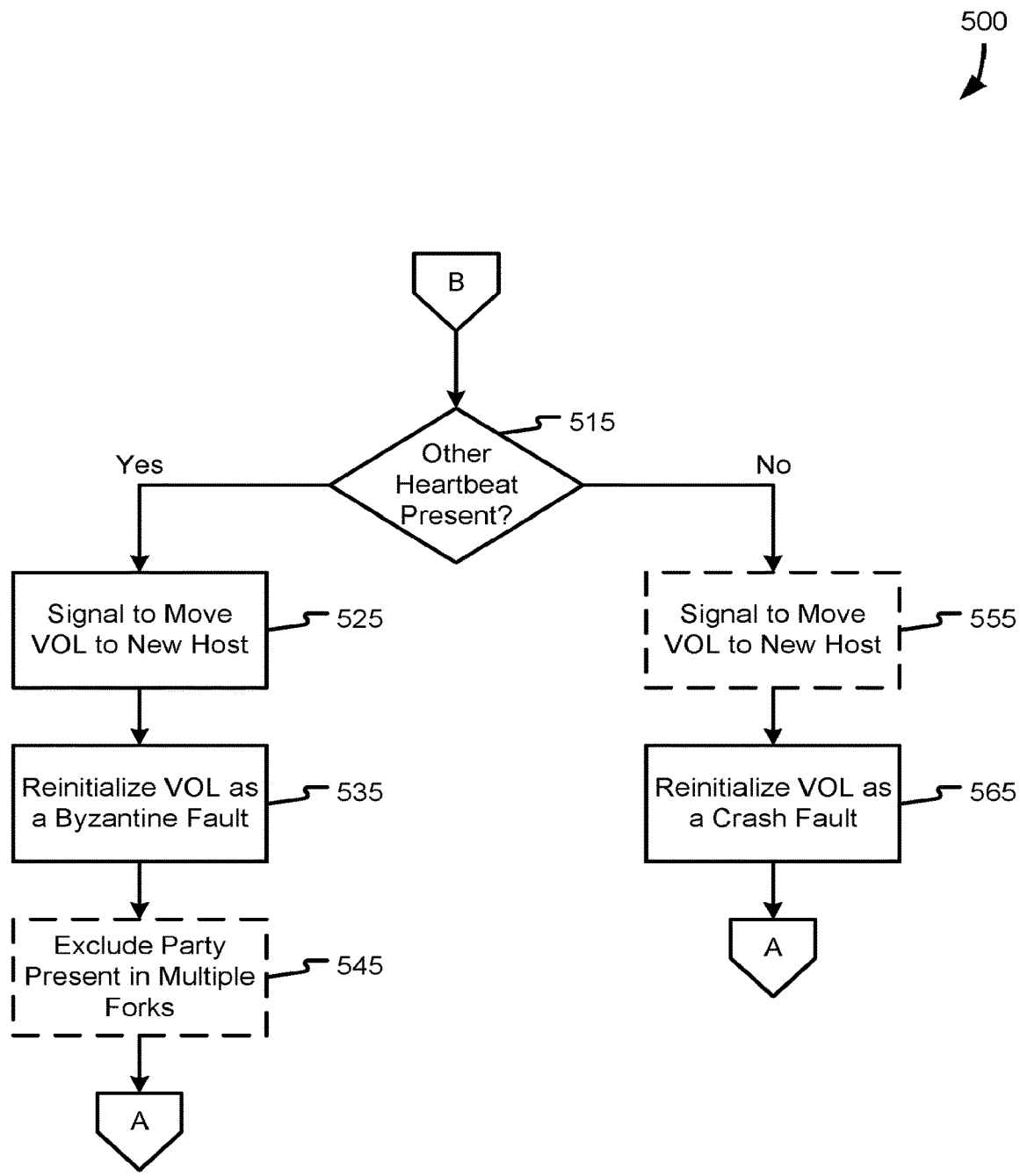

FIGS. 5A and 5B are a flow chart showing general stages involved in an example method 500 for ensuring that multiple parties see consistent states of a digital ledger, and that the parties can avoid inconsistencies and recover from transactions resulting in inconsistences in the digital ledger.

Method 500 begins at OPERATION 510 illustrated in FIG. 5A, where a client receives the current state of the blockchain 200 maintained in the VOL 130. In various aspects, this state may be a genesis state 210 known to the client at the time the VOL 130 is initialized, or may be received via a request to the ledger server 120 for a later state (e.g., via a SYNC command). Method 500 proceeds to OPERATION 520 for the client to create a heartbeat transaction 410 based on the state received in OPERATION 510 and the height of the blockchain 200. In various aspects, the heartbeat transaction 410 is a digitally signed block of data based on the current state of the blockchain 200 seen by the client and its height. In other aspects, the heartbeat transaction 410 is a Proof of Work that has its solution based on the current state and height of the blockchain 200. The heartbeat transaction 410 is then transmitted to the ledger server 120 to incorporate into the next transaction block 220 of the VOL 130 in OPERATION 530.

Proceeding to OPERATION 540, the client requests the current state of the blockchain 200 for the VOL 130 from the ledger server 120. For example, the client may transmit a SYNC request to the ledger server 120 requesting the tail value of the blockchain 200 and the transactions accepted into the blockchain 200 since the client last transmitted a SYNC request. The client uses these data to determine whether the blockchain 200 has incorporated the client's heartbeat (at DECISION 550) and whether the blockchain 200 has incorporated heartbeats from other clients (at DECISION 560). In response to determining that both the client's heartbeat and the heartbeats of the other clients are present in the blockchain 200, method 500 proceeds to OPERATION 570. When a heartbeat transaction 410 is not present in the blockchain 200, the tail value of the blockchain 200 maintained in the VOL 130 or will differ from that in the local copy 140 or the list of transactions will not include the heartbeat transaction 410. In response to determining that either the client's heartbeat is not present in the blockchain 200 or a heartbeat from at least one other client is not present in the blockchain 200, method 500 proceeds to DECISION 580.

At OPERATION 570 it is determined by the client to continue trusting the accuracy and integrity of the VOL 130. Method 500 then returns to OPERATION 520 for the client to create an additional heartbeat transaction 410 and continue normal use of the VOL 130 to submit and receive additional transactions.

At DECISION 580, it is determined whether the lack of heartbeat transactions 410 in the VOL 130 is a violation of trust in the VOL 130. As will be appreciated, due to transmission times, processing latencies, limits on the sizes of transaction blocks 220, the frequency at which the clients transmit heartbeat transactions 410, etc., a client will tolerate some discrepancies in the presence of heartbeats as part of the normal operation of the VOL 130. For example, a client may expect that (on occasion) its heartbeat transaction 410 based on height $h_1$ will not be incorporated into the transaction block 220 used to create the updated state 230 of height $h_2$, but will be deferred to a later transaction block 220. Similarly, a client will also expect that, on occasion, the other clients will experience the same delays in posting heartbeat transactions 410.

The client will therefore maintain a "last seen" status for heartbeats from each client (including itself) to determine whether the period since a given client's heartbeat transaction 410 was seen violates its fault tolerance rules. In various aspects, the period is defined as a length of time, a difference in blockchain heights, a number of transactions (from a given client or from more than one client), and combinations thereof. In various aspects, the fault tolerance rules are violated when the period since the last heartbeat transaction 410 is too large, a heartbeat transaction 410 is improperly signed, a heartbeat transaction 410 signs an unknown state or height, or metadata analysis indicate that a client has been spoofed or is behaving maliciously although otherwise providing correct heartbeat transactions 410. Depending on client preferences or the initial setup of the VOL 130, fault tolerance rules will allow for different fault detection rates for different types of faults (e.g., crash faults versus Byzantine faults versus incorrect heartbeat faults) and may make use of fault tolerance methods such as the Practical Byzantine Fault Tolerance algorithm.

In response to the fault tolerance rules not yet resulting in a violation, method 500 proceeds from DECISION 580 to OPERATION 570. In response to a violation of the fault tolerance rules, method 500 proceeds to OPERATION 590. At OPERATION 590 it is determined by the client to cease trusting the accuracy and integrity of the VOL 130; the client distrusts the VOL 130 either due to malicious actions (by a client or the ledger host) or a failure that needs to be addressed to regain trust in the VOL 130. Method 500 proceeds from OPERATION 590, illustrated in FIG. 5A, to DECISION 515, illustrated in FIG. 5B, where the presence of heartbeat transactions 410 are used to determine how to regain trust in the VOL 130.

At DECISION 515, it is determined whether the violation of the fault tolerance rules is due to a crash-type fault or a Byzantine fault. In response to the client seeing valid heartbeats from other clients, method 500 proceeds to OPERATION 525 to resolve the fault. In response to the client not seeing valid heartbeats from other clients, method 500 proceeds to OPERATION 575 to resolve the fault.

At OPERATION 525 the client signals for the VOL 130 to be moved to a new host. In various aspects, the client transmits a termination signal to the current ledger server 120 to terminate the VOL 130 as it is hosted thereon and transmits an initialization signal to a new ledger server 120 to begin hosting the VOL 130. The new ledger server 120 to fail over to in the event of a fault is agreed to by the clients at the time the VOL 130 was initialized, and may be named in the genesis state 210 or selected via an algorithm encoded in the genesis state 210.

The client signals to the new ledger server 120 at OPERATION 535 that the VOL 130 is to be reinitialized at a Byzantine fault recovery height of the blockchain 200. To recover from a Byzantine fault, the height of the blockchain 200 that the parties using the VOL 130 agree to is equal to twice the number of clients reporting a fault, plus one (e.g., the Byzantine fault height is 2·F+1, where F is a number of faults in the blockchain 200). In various aspects, the new ledger server 120 will query the clients as to whether they see a fault, or will determine, based on the state data received from the clients after reinitialization, the number of faults present in the VOL 130 (which may not be visible to a given client). Once a height in the blockchain 200 that (2·F+1) clients agree upon (a last-known-shared state) is determined, the VOL 130 is reinitialized at that height. Any transactions incorporated into transaction blocks 220 at or above that height will need to be rerun to advance the state of the state machine maintained by the VOL 130.

Method 500 optionally proceeds to OPERATION 545 where the client receives an alert as to the identity of any party found to have been active in multiple forks of the VOL 130, and therefore likely to have acted maliciously to cause the fault. The client is operable to signal to the new ledger server 120 whether those potentially malicious clients are to be denied access (temporarily or permanently) to the VOL 130. In various aspects, the clients using the VOL 130 are enabled to form a consensus on whether to exclude a party present in multiple forks of the faulted VOL 130 from participating in the new VOL 130.

Once the VOL 130 has be reinitialized at the last-known-shared state that the consensus has agreed to, method 500 returns to OPERATION 520, illustrated in FIG. 5A, for the client to create an additional heartbeat transaction 410 and continue normal use of the VOL 130 to submit and receive additional transactions.

To recover from a crash-type fault, the client optionally signals at OPERATION 555 for the VOL 130 to be moved to a new host. OPERATION 555 is omitted in aspects where the client still trusts the current ledger server 120, for example, when the client knows (or suspects) that it or another client is recovering from a crash or other downtime that resulted in the fault. In various aspects, when the client does not trust the current ledger server 120, the client transmits a termination signal to the current ledger server 120 to terminate the VOL 130 as it is hosted thereon and transmits an initialization signal to a new ledger server 120 to begin hosting the VOL 130. The new ledger server 120 to fail over to in the event of a fault is agreed to by the clients at the time the VOL 130 was initialized, and may be named in the genesis state 210 or selected via an algorithm encoded in the genesis state 210.

The client signals to the ledger server 120 at OPERATION 565 that the VOL 130 is to be reinitialized at a crash fault recovery height of the blockchain 200. To recover from a crash fault, the height of the blockchain 200 that the parties using the VOL 130 agree to is equal to the number of clients reporting a fault, plus one (e.g., the crash fault height is F+1, where F is a number of faults in the blockchain 200). In various aspects, the (new) ledger server 120 will query the clients as to whether they see a fault, or will determine, based on the state data received from the clients after reinitialization, the number of faults present in the VOL 130 (which may not be visible to a given client). Once a height in the blockchain 200 that (F+1) clients agree upon (a last-known-shared state) is determined, the VOL 130 is reinitialized at that height. Any transactions incorporated into transaction blocks 220 at or above that height will need to be rerun to advance the state of the state machine maintained by the VOL 130.

Once the VOL 130 has be reinitialized at the last-known-shared state that the consensus has agreed to, method 500 returns to OPERATION 520, illustrated in FIG. 5A, for the client to create an additional heartbeat transaction 410 and continue normal use of the VOL 130 to submit and receive additional transactions.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
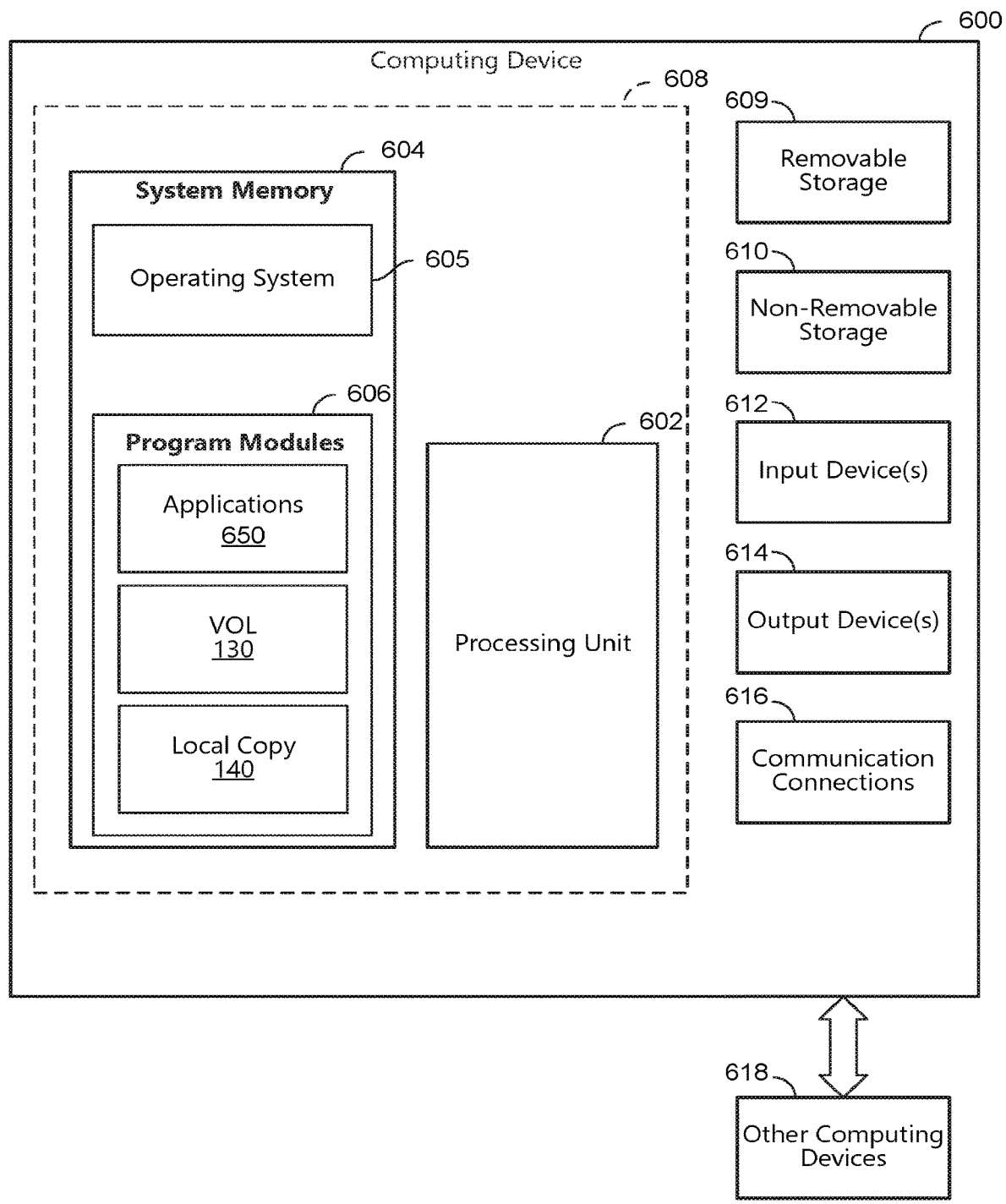
FIG. 6 is a block diagram illustrating example physical components of a computing device.
Figure 7A:
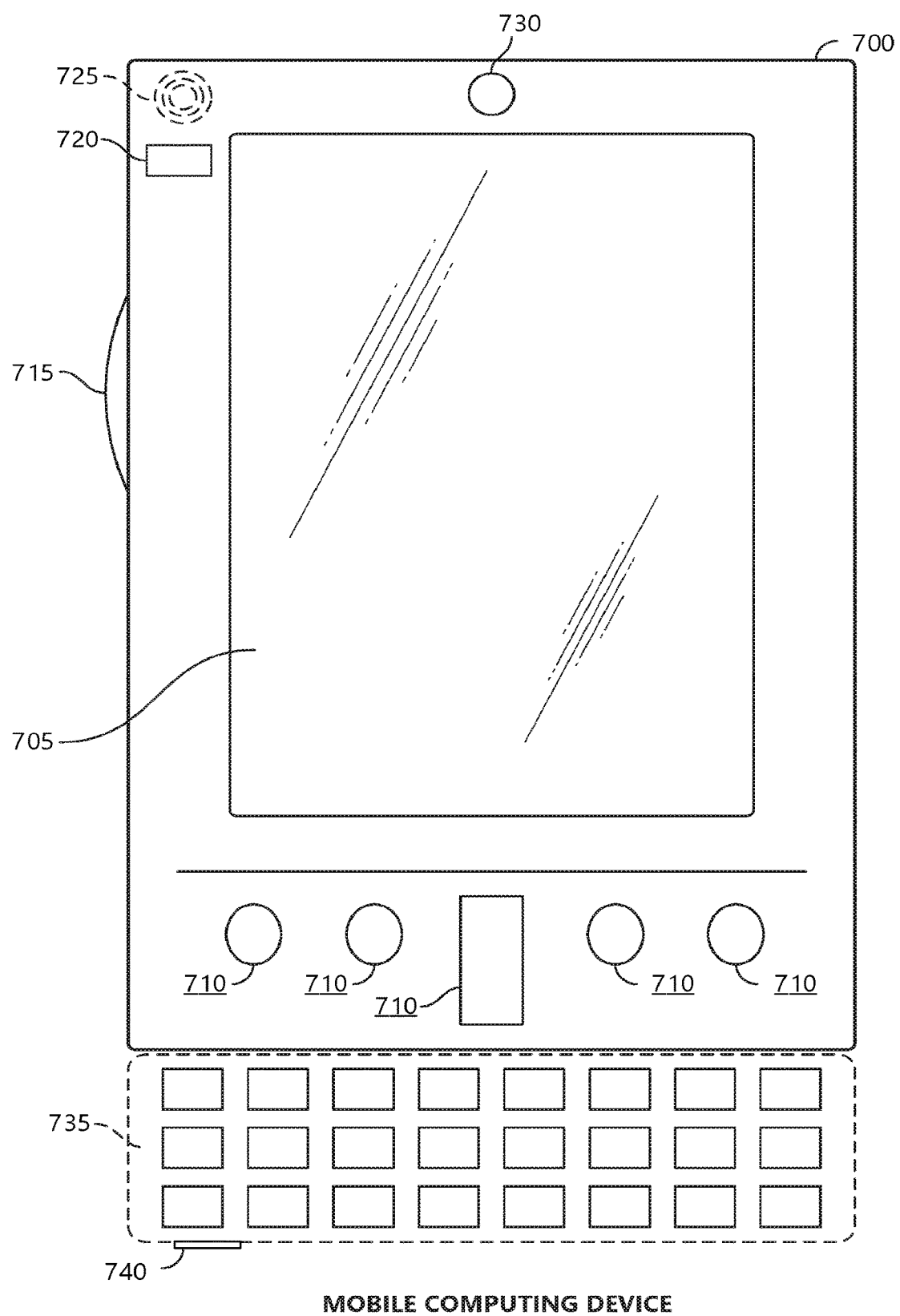
FIGS. 7A and 7B are block diagrams of a mobile computing device.
Figure 7B:
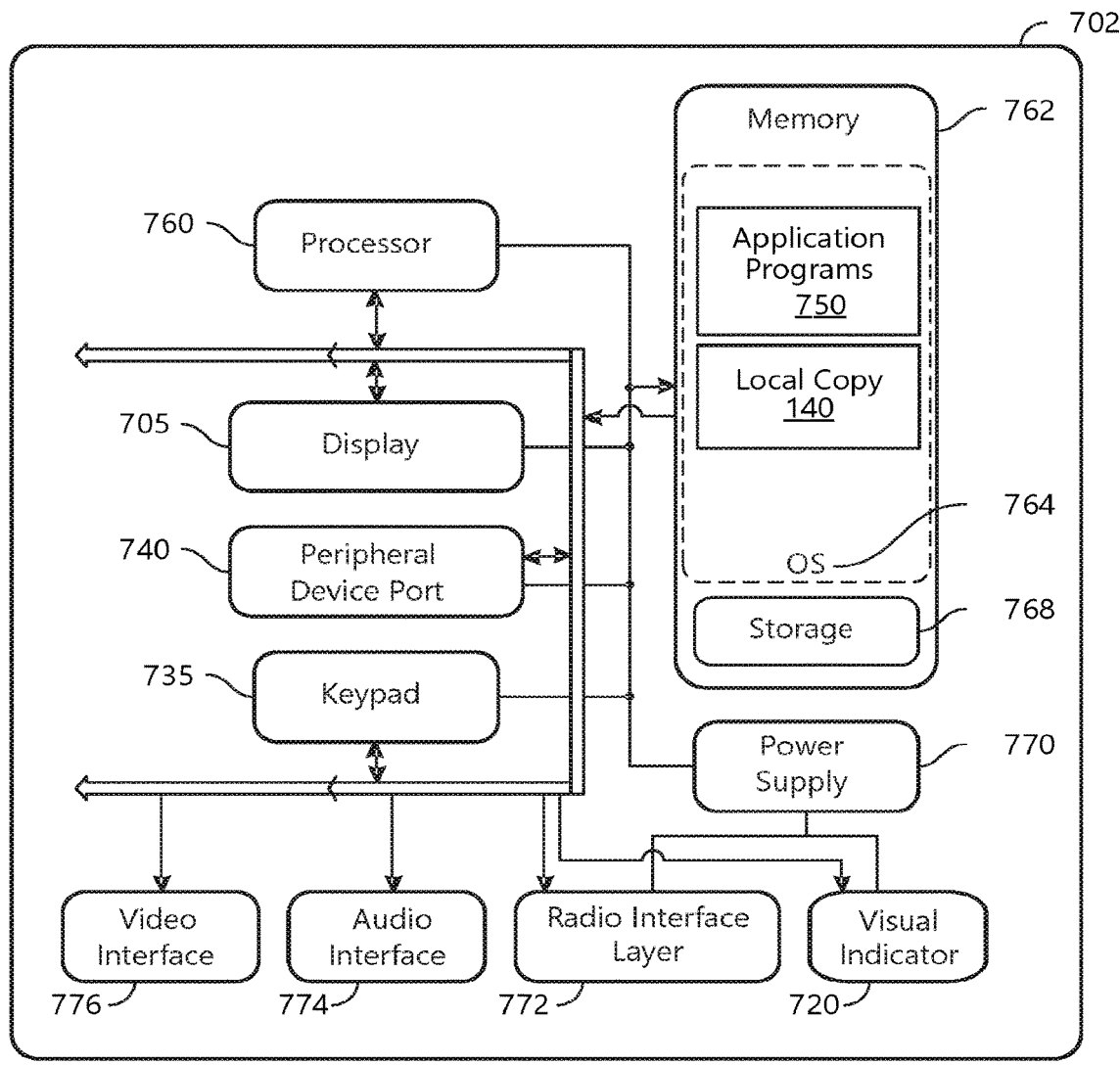
Figure 8:
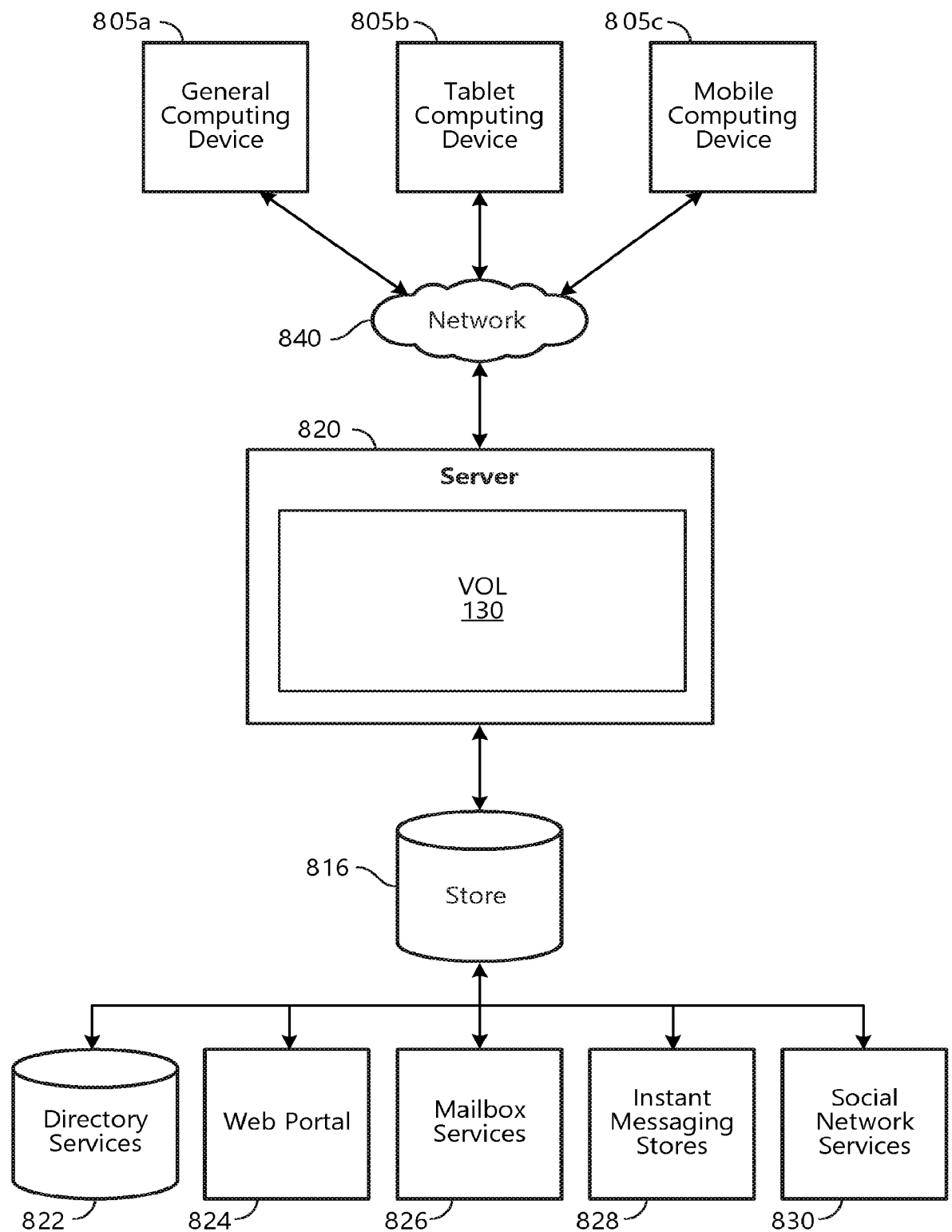
FIG. 8 is a block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes VOLs 130, local copies 140 thereof, and applications running within VOLs 130. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., VOL 130 or local copy 140) perform processes including, but not limited to, one or more of the stages of the method 500 illustrated in FIGS. 5A and 5B. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, a local copy 140 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 are stored locally on the mobile computing device 700, as described above. According to another aspect, the data are stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated such data/information are accessible via the mobile computing device 700 via the radio 772 or via a distributed computing network. Similarly, according to an aspect, such data/information are readily transferred between computing devices for storage and use according to well-known data/information transfer and storage means, including electronic mail and collaborative data/information sharing systems.

FIG. 8 illustrates one example of the architecture of a system for ensuring that multiple parties see the same state of a digital ledger and can avoid and recover from malicious (or erroneous) transactions made to that digital ledger as described above. Content developed, interacted with, or edited in association with the VOL 130 is enabled to be stored in different communication channels or other storage types. For example, various documents may be stored using a directory service 822, a web portal 824, a mailbox service 826, an instant messaging store 828, or a social networking site 830. The VOL 130 is operative to use any of these types of systems or the like ensuring that multiple parties see the same state of a digital ledger and can avoid and recover from malicious (or erroneous) transactions made to that digital ledger, as described herein. According to an aspect, a server 820 provides the VOL 130 to clients 805a,b,c. As one example, the server 820 is a web server providing the VOL 130 over the web. The server 820 provides the VOL 130 over the web to clients 805 through a network 840. By way of example, the client computing device is implemented and embodied in a personal computer 805a, a tablet computing device 805b or a mobile computing device 805c (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method comprising:
   receiving, by a client device, a current state and height of a blockchain from a ledger computing device;
   determining whether the current state includes heartbeat transactions from one or more client devices having access to a digital ledger, wherein the heartbeat transactions are:
   created by the one or more client devices based on one or more previous states and heights of the blockchain accessed by the one or more client devices; and
   transmitted by the one or more client devices to the ledger computing device for inclusion within the blockchain; and
   in response to determining that the current state does not include the heartbeat transactions, ceasing to trust the digital ledger.

2. The method of claim 1, further comprising:
   prior to receiving the current state and height of the blockchain:
   transmitting a synchronization request to the ledger computing device;
   receiving a genesis state of the blockchain in response to the synchronization request; and
   creating a first heartbeat transaction based on the genesis state.

3. The method of claim 2, wherein first heartbeat transaction is included in the heartbeat transactions and the client device is included in the one or more client devices.

4. The method of claim 1, wherein receiving the current state and height of the blockchain comprises:
   transmitting, to the ledger computing device, a current synchronization request for the blockchain, the current synchronization request requesting a tail value of the blockchain and transactions accepted into the blockchain since the client device provided a last synchronization request; and
   receiving the current state and height of the blockchain in response to the current synchronization request.

5. The method of claim 1, wherein ceasing to trust the digital ledger comprises determining that the heartbeat transactions not being included in the current state is a violation of a trust of the digital ledger.

6. The method of claim 1, wherein the violation of the trust of the digital ledger is based on at least one of:
   transmission times;
   processing latencies;
   limits on sizes of transaction blocks; or
   a transmission frequency of the heartbeat transactions.

7. The method of claim 1, further comprising:
   in response to ceasing to trust the digital ledger, providing a signal to the ledger computing device to move the digital ledger to another computing device.

8. The method of claim 1, further comprising:
   in response to ceasing to trust the digital ledger, providing a signal to the ledger computing device to reinitialize the digital ledger on the ledger computing device.

9. A system comprising:
   a processor; and
   memory coupled to the processor, the memory comprising computer executable instructions that, when executed by the processor, perform operations comprising:
   providing, by a ledger server, a current state and height of a blockchain to a client device, the current state including first heartbeat transactions from the client device;
   receiving, by the ledger server, a signal to reinitialize a digital ledger stored on the ledger server, the signal being based on a determination that the current state further includes second heartbeat transactions from multiple client devices having access to the digital ledger, wherein the second heartbeat transactions are created by the multiple client devices based on previous states and heights of the blockchain as viewed by the multiple client devices; and reinitializing the digital ledger on the ledger server based on the signal.

10. The system of claim 9, wherein each heartbeat of the first heartbeat transactions and the second heartbeat transactions is digitally signed.

11. The system of claim 9, wherein each heartbeat of the first heartbeat transactions and the second heartbeat transactions is a Proof of Work having a solution based on a viewed state and height of the blockchain.

12. The system of claim 9, the operations further comprising:
   receiving, from the client device, a synchronization request to synchronize the digital ledger stored on the ledger server with a version of the digital ledger stored by the client device; and
   providing the current state and height of the blockchain to the client device in response to the synchronization request.

13. The system of claim 9, wherein reinitializing the digital ledger comprises reinitializing the digital ledger at a crash fault recovery height of the blockchain.

14. The system of claim 13, wherein the crash fault recovery height is equal to one plus a number of the multiple client devices reporting a fault.

15. The system of claim 14, wherein any transactions incorporated into the blockchain at or above the crash fault recovery height are rerun to include the transactions within the reinitialized digital ledger.

16. A system comprising:
   a processor; and
   memory coupled to the processor, the memory comprising computer executable instructions that, when executed by the processor, perform operations comprising:
      providing, by a first ledger server, a current state and height of a blockchain to a first client device, the current state including first heartbeat transactions from the first client device;
      receiving, by the first ledger server, a signal to terminate a digital ledger stored on the first ledger server, the signal being based on a determination that the current state does not include second heartbeat transactions from at least a second client device having access to the digital ledger, wherein the second heartbeat transactions are created by the second client device based on one or more previous states and heights of the blockchain accessed by the second client device; and
      terminating the digital ledger on the first ledger server based on the signal.

17. The system of claim 16, wherein terminating the digital ledger on the first ledger server comprises deactivating the digital ledger and not removing the digital ledger from the first ledger server.

18. The system of claim 16, wherein terminating the digital ledger on the first ledger server comprises moving the digital ledger from the first ledger server to a second ledger server.

19. The system of claim 18, wherein moving the digital ledger from the first ledger server to the second ledger server comprises reinitializing the digital ledger on the second ledger server at a Byzantine fault recovery height of the blockchain.

20. The system of claim 19, wherein Byzantine fault recovery height of the blockchain is equal to one plus twice a number of client devices reporting a fault.

* * * * *